United States Patent
Brunet et al.

(10) Patent No.: US 7,937,944 B2
(45) Date of Patent: May 10, 2011

(54) SYSTEM FOR VENTILATING A COMBUSTION CHAMBER WALL

(75) Inventors: Antoine Robert Alain Brunet, Moissy Cramayel (FR); Patrice Andre Commaret, Rubelles (FR); Didier Hippolyte Hernandez, Quiers (FR); David Locatelli, Gex (FR)

(73) Assignee: SNECMA, Paris (FR)

( * ) Notice: Subject to any disclaimer, the term of this patent is extended or adjusted under 35 U.S.C. 154(b) by 926 days.

(21) Appl. No.: 11/780,287

(22) Filed: Jul. 19, 2007

(65) Prior Publication Data

US 2008/0141680 A1 Jun. 19, 2008

(30) Foreign Application Priority Data

Jul. 19, 2006 (FR) ...................................... 06 06542

(51) Int. Cl.
 *F02C 7/22* (2006.01)
(52) U.S. Cl. ........................................... 60/751; 60/806
(58) Field of Classification Search ............... 60/726, 60/751, 782, 785, 806; 415/115, 144, 145; 416/95, 96 R See application file for complete search history.

(56) References Cited

U.S. PATENT DOCUMENTS

| | | | | |
|---|---|---|---|---|
| 3,088,279 A | * | 5/1963 | Diedrich | .......................... 60/804 |
| 4,462,204 A | * | 7/1984 | Hull | ................. 60/806 |
| 4,761,947 A | * | 8/1988 | Hennecke et al. | ............... 60/806 |
| 5,555,721 A | | 9/1996 | Bourneuf et al. | |
| 5,628,193 A | * | 5/1997 | Kington et al. | .................. 60/752 |
| 2003/0167775 A1 | | 9/2003 | Soechting et al. | |

FOREIGN PATENT DOCUMENTS

GB 2 093 532 A 9/1982
WO WO 03/098020 A2 11/2003

OTHER PUBLICATIONS

U.S. Appl. No. 11/778,928, filed Jul. 17, 2007, Argaud, et al.
U.S. Appl. No. 11/779,000, filed Jul. 17, 2007, Argaud, et al.
U.S. Appl. No. 11/779,016, filed Jul. 17, 2007, Argaud, et al.
U.S. Appl. No. 11/780,225, filed Jul. 19, 2007, Brunet, et al.
U.S. Appl. No. 11/780,223, filed Jul. 19, 2007, Brunet, et al.
U.S. Appl. No. 11/780,246, filed Jul. 19, 2007, Commaret, et al.
U.S. Appl. No. 12/190,105, filed Aug. 12, 2008, Commaret, et al.

* cited by examiner

*Primary Examiner* — Michael Cuff
*Assistant Examiner* — Phutthiwat Wongwian
(74) *Attorney, Agent, or Firm* — Oblon, Spivak, McClelland, Maier & Neustadt, L.L.P.

(57) ABSTRACT

A system for ventilating a combustion chamber wall in a turbomachine is disclosed. The system includes a centrifugal compressor, a diffuser, a combustion chamber, and an annular case arranged radially between the combustion chamber and a downstream end-piece of the diffuser. The annular case includes a radially external wall for the guidance of an air flow coming out of the diffuser, and a radially internal wall delimiting with the end-piece of the diffuser a channel for the air coming out of the diffuser to pass through.

15 Claims, 2 Drawing Sheets

SYSTEM FOR VENTILATING A COMBUSTION CHAMBER WALL

The present invention relates to a system for ventilating a combustion chamber wall in a turbomachine comprising a centrifugal compressor and a diffuser supplying an annular combustion chamber with air.

BACKGROUND OF THE INVENTION

In a conventional manner, the annular combustion chamber of the turbomachine is situated in an annular space delimited by an external casing, this casing supporting the diffuser which comprises an annular end-piece which extends downstream and along the rotor or impeller of the centrifugal compressor.

DESCRIPTION OF THE PRIOR ART

The air coming out of the diffuser is intended, primarily, to enter the combustion chamber and be mixed with fuel and then burnt, and secondarily, to travel round the combustion chamber and to supply primary and dilution orifices of the chamber and of the air injection means for ventilating and/or cooling a turbine situated downstream of the combustion chamber (see for example document U.S. Pat. No. 5,555,721).

The air that travels round the chamber passing between the latter and the end-piece of the diffuser is not guided and is subjected to turbulence, separations of flow and considerable pressure losses that reduce the performance of the turbomachine.

A small portion of the air flow coming out of the compressor does not enter the diffuser and flows in a radial annular passageway formed between the impeller of the compressor and the end-piece of the diffuser, this air being relatively hot because of its viscous shearing between the impeller and the end-piece of the diffuser.

SUMMARY OF THE INVENTION

The object of the invention is in particular to improve the performance of these ventilation systems and to prevent the disadvantages of the prior art.

Accordingly it proposes a system for ventilating a combustion chamber wall in a turbomachine comprising a centrifugal compressor supplying, via a diffuser, an annular combustion chamber, the diffuser comprising an annular end-piece with a substantially L-shaped section that extends downstream and along the impeller of the centrifugal compressor in order to form a radial annular passageway for the flow of air communicating at its radially external end with the outlet of the compressor, wherein an annular case is arranged radially between the combustion chamber and the end-piece of the diffuser and extends axially from the diffuser to the vicinity of the outlet of the combustion chamber and of the downstream end of the end-piece of the diffuser, this case comprising a radially external wall of revolution for the guidance, along a radially internal wall of the combustion chamber, of an air flow coming out of the diffuser, and comprising a radially internal wall of revolution delimiting, with the end-piece of the diffuser, an annular channel for air coming out of the diffuser to pass through.

The case according to the invention ensures a stable air flow, without separation and with minimal pressure losses along the internal wall of the combustion chamber, which allows an optimal supply of the air injection means and of the primary and dilution orifices of the internal wall of the chamber.

The air that flows between the case according to the invention and the end-piece of the diffuser also cools and ventilates the end-piece of the diffuser which can therefore absorb a portion of the heat generated by the shearing of the air coming out of the compressor and passing between the impeller of the compressor and the end-piece of the diffuser.

Preferably, the radially external wall of the case extends substantially parallel to the internal wall of the combustion chamber, and the radially internal wall of the case extends substantially parallel to the end-piece of the diffuser.

The walls of revolution of the case advantageously comprise pressure-balancing orifices in order to limit their deformations in operation.

In a preferred embodiment of the invention, the case comprises an upstream cylindrical rim and a downstream cylindrical rim centered and supported on the diffuser and on an annular ring of the internal wall of the combustion chamber, respectively.

The rims of the case may be attached by shrink-fitting to the diffuser and to the annular ring of the internal wall of the combustion chamber, respectively.

The upstream cylindrical rim of the case is advantageously crenellated and forms orifices supplying, with air coming out of the diffuser, the air passageway channel along the end-piece of the diffuser.

The case is advantageously formed of two half-shells juxtaposed transversely, which makes the case easier to install in the turbomachine. A cylindrical ring may be engaged axially and attached for example by welding to the downstream cylindrical rim of the case in order to keep the two half-shells assembled.

The invention also relates to a turbomachine, such as an aircraft turbojet or turboprop, which comprises a ventilation system as described above.

Finally the invention relates to a case for a system for ventilating a combustion chamber wall in a turbomachine, which comprises two coaxial walls of revolution extending one inside the other, the upstream ends of these walls being connected to one another by an axial cylindrical rim oriented upstream, and the downstream ends of these walls being connected to one another by an axial cylindrical rim oriented downstream.

According to an embodiment of the invention, the radially external wall of the case is substantially frustoconical, and the radially internal wall of the case has a substantially U-shaped section. These walls advantageously comprise orifices in order to balance pressure in operation.

In order to make it easier to install, the case is formed of at least two half-shells that are juxtaposed transversely and that can be kept assembled by a cylindrical ring engaged axially and attached for example by welding to the downstream cylindrical rim of the case.

BRIEF DESCRIPTION OF THE DRAWINGS

The invention will be better understood and other details, features and advantages of the present invention will appear on reading the following description made as a nonlimiting example and with reference to the appended drawings, in which.

DESCRIPTION OF THE PREFERRED EMBODIMENTS

Figure 1:
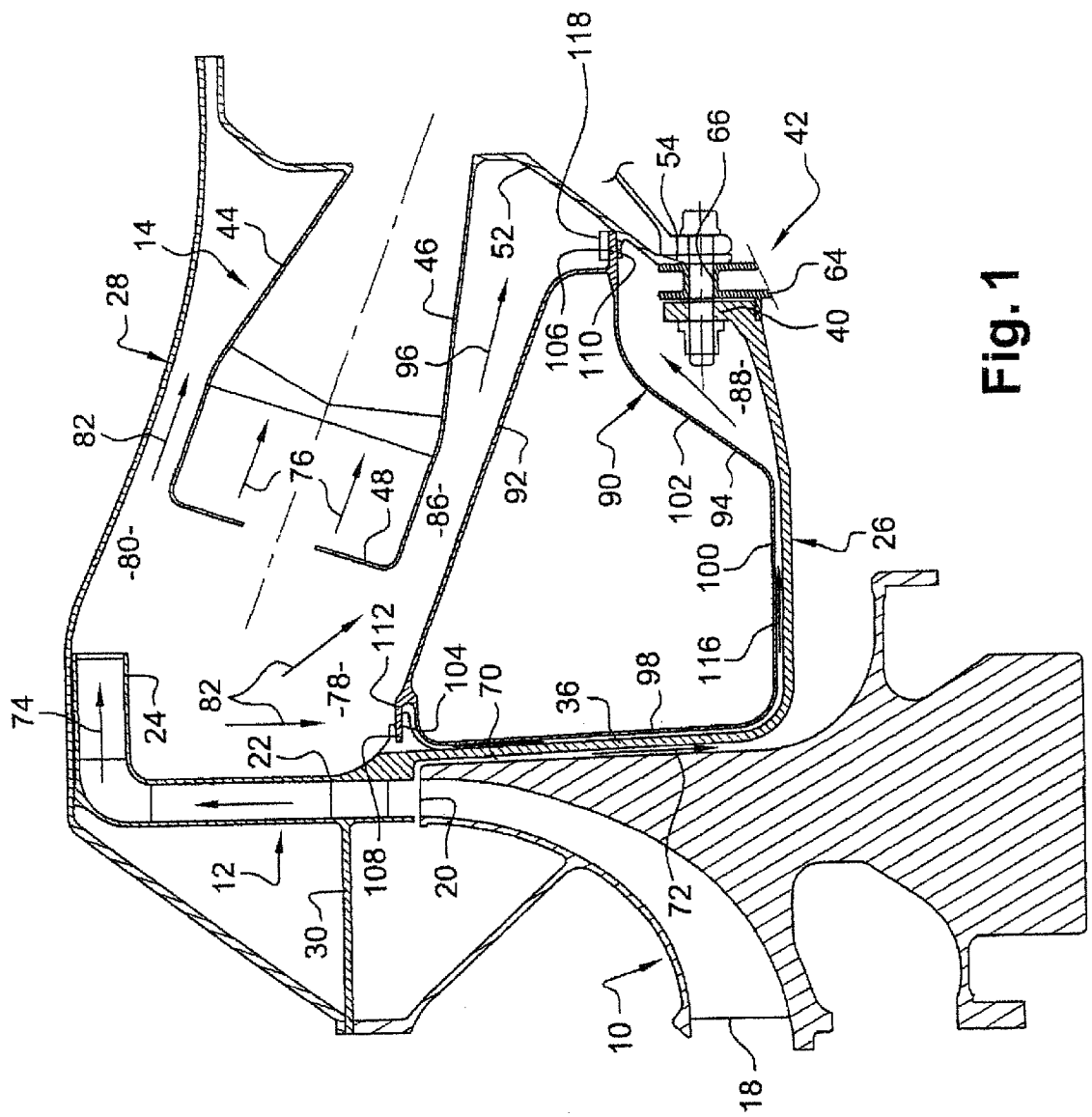
FIG. 1 is a partial schematic view in axial section of a ventilation system according to the invention.

Reference is made first to FIG. 1 which represents a portion of a turbomachine, such as an aircraft turbojet or turboprop, comprising, from upstream to downstream, in the direction of flow of the gases inside the turbomachine, a centrifugal compressor 10, a diffuser 12 and a combustion chamber 14.

The inlet 18 of the centrifugal compressor 10 is oriented upstream, substantially parallel to the axis of the turbomachine, and its outlet 20 is oriented outward, substantially perpendicularly to the axis of the turbomachine, and is aligned with a radial portion 22 of the diffuser 12. The diffuser has a shape that is generally bent at 90° and comprises an axial outlet portion 24 that is connected to the radial portion 22 and that extends along the external casing 28 and opens at its radially downstream end on the outside of the inlet of the combustion chamber 14.

The diffuser 12 is supported by the external casing 28 which externally surrounds the compressor 10, the diffuser 12 and the combustion chamber 14.

The diffuser 12 comprises a substantially cylindrical upstream ring 30 attached by appropriate means of the screw-nut type to the external casing 28.

The diffuser 12 also comprises a downstream annular end-piece 26 with a similarly L-shaped section that comprises an upstream radial portion 36 that extends inward from the inlet 22 of the diffuser, and a substantially cylindrical downstream portion that extends downstream from the radially internal end of the radial portion 36 and comprises at its downstream end an annular flange 40 for attachment to air injection means 42 for ventilating and/or cooling in components situated downstream of the combustion chamber 14.

The radial portion 36 of the end-piece of the diffuser extends downstream of the rotor of the centrifugal compressor, also called the "impeller" along and at a short distance from the latter in order to form a radial annular passageway 70 communicating at its radially external end with the outlet 20 of the centrifugal compressor.

The combustion chamber 14 comprises two coaxial walls of revolution 44, 46 extending one inside the other and connected at their upstream ends to a chamber-bottom wall 48, these walls 44, 46 and 48 delimiting between them an annular enclosure into which fuel is brought by injectors (not shown).

The radially external wall 44 of the chamber is attached at its downstream end to the external casing 28, and the radially internal wall 46 is connected at its downstream end to a frustoconical ring 52 that comprises, at its radially internal end, an internal annular flange 54 for attachment to the aforementioned air injection means 42.

The air injection means 42 comprise an annular duct 64 that opens outward at its radially upstream end, downstream of the flange 40 of the end-piece and upstream of the flange 54 of the ring 52, respectively, and at its downstream end axially downstream. The upstream end portion of the means 42 comprises orifices 66 for means of the screw-nut type to pass through that extend through corresponding orifices in the flanges 40 and 54.

A small portion of the air flow coming out of the centrifugal compressor 10 enters the radial passageway 70 formed between the impeller of the compressor and the end-piece 26 of the diffuser. This air (arrow 72) is subjected to considerable shearing forces caused by the rotation of the impeller close to the end-piece 26 of the diffuser, which generates a rise in temperature of the air and a heating of the impeller and the end-piece.

The air coming out of the diffuser 12 (arrow 74) supplies partly the combustion chamber 14 (arrows 76) and partly an internal annular stream 78 and an external annular stream 80 traveling round the combustion chamber 14 (arrows 82).

The external stream 80 is formed between the external casing 28 and the external wall 44 of the chamber, and the air that enters this channel is used to cool and/or ventilate components, not shown, situated downstream of this chamber.

The internal stream 78 is formed between the chamber-bottom wall 48 and the radial portion 22 of the diffuser, and the air that enters this stream is divided into a flow that supplies the air injection means 42 and a flow that passes through the primary and dilution orifices (not shown) of the chamber.

In the prior art, the air that flowed in the internal stream 78 was not guided and was subjected to turbulence, separations of flow and considerable pressure losses reducing the performance of the turbomachine.

The system according to the invention makes it possible to remove these disadvantages by creating channels 86, 88 for the flow of stable air between the end-piece 26 of the diffuser and the internal wall 46 of the chamber by means of an annular case arranged radially between the end-piece 26 and the combustion chamber 14.

Figure 2:
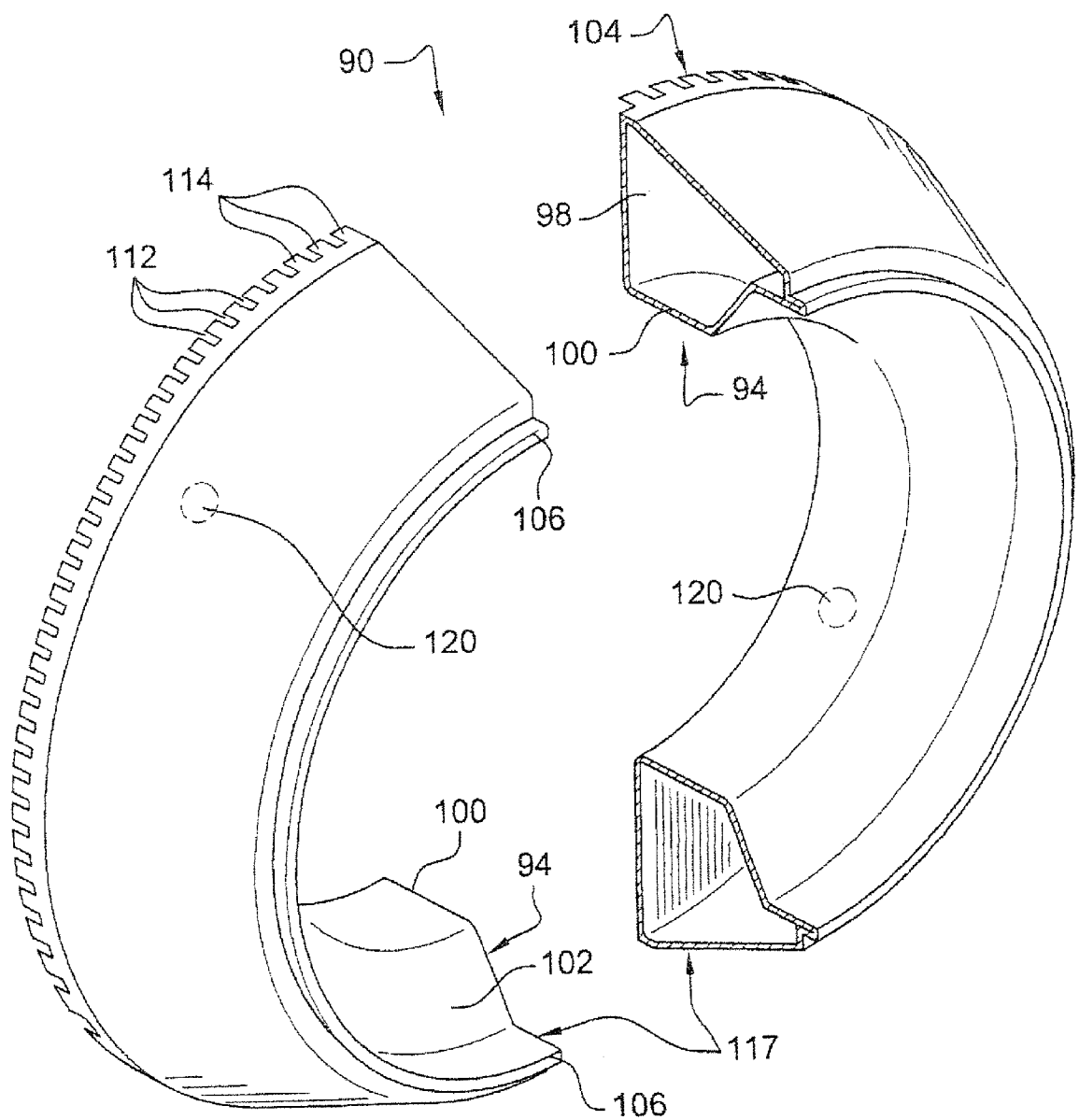
FIG. 2 is an exploded schematic view in perspective of the annular case of the system of FIG. 1, seen from downstream.

In the example represented in FIGS. 1 and 2, the annular case 90 comprises a substantially frustoconical radially external wall of revolution 92 which extends inward downstream, and a substantially U-shaped radially internal wall of revolution 94.

The external wall 92 extends substantially parallel to the internal wall 46 of the chamber and at a distance from the latter for the guidance of a portion 96 of the air flow 82 which travels round the chamber via the inside. The air in this channel 86 is channeled by the external wall 92 of the case and the wall 46 of the chamber, which makes it possible to prevent separations and limit the turbulence and pressure losses.

The U-shaped internal wall 94 of the case comprises an upstream annular portion 98 that is parallel to and at a short distance from the radial portion 36 of the end-piece and that is connected via its radially external end, with the upstream end of the external wall 92, to a cylindrical rim 104 oriented upstream. The wall 94 also comprises an intermediate cylindrical portion 100 that extends around and at a short distance from the end-piece 26, and a substantially frustoconical downstream annular portion 102 that extends downstream and outward around the air injection means 42, and that is connected via its downstream end, with the downstream end of the external wall 92, to a cylindrical rim 106 oriented downstream.

The upstream rim 104 of the case is engaged from downstream in an annular groove 108 opening downstream and formed at the radially internal end of the inlet 22 of the diffuser, and the downstream rim 106 is mounted on a cylindrical rim 110 oriented upstream of the ring 52 of the chamber. The groove 108 and the rim 110 make it possible to support and center the case, as will be described in greater detail below.

The upstream rim 104 of the case is of the crenellated type and comprises notches or slits 112 alternated with solid portions 114 and evenly distributed about the axis of the case (FIG. 2). The notches 112 form orifices for air to pass through and their axial dimension is greater than the axial dimension of the groove 108 of the diffuser so that a portion 116 of the air flow 82 traveling round the chamber via the inside can pass through these notches and flow between the internal wall 94 of the case and the end-piece 26 of the diffuser in order to cool them and then supply the injection means 42.

This air 116 makes it possible in particular to ventilate and cool the end-piece 26 of the diffuser that is exposed in operation to considerable temperature rises of the air 72 sheared between the impeller of the compressor and the end-piece 26. This end-piece 26 can therefore absorb a large proportion of the heat generated by this shearing and in this manner limits the heating of the impeller of the compressor and increases its service life.

The case 90 is formed of at least two half-shells 117 (FIG. 2) that are juxtaposed transversely and, by a cylindrical ring 118, are kept engaged on the downstream cylindrical rim 106 of the case and attached for example by welding to this rim (FIG. 1).

This case 90 is mounted in the turbomachine as follows: After the diffuser 12 has been mounted on the centrifugal compressor 10 and before the injection means 42 and the combustion chamber 14 are assembled to the end-piece 26 of the diffuser, the two half-shells 117 separated from one another are brought transversely on either side of the end-piece 26 and juxtaposed, then the ring 118 is engaged axially and attached to the downstream rim 106 of the case. The rim 104 of the case 90 is then fitted into the groove 108 of the diffuser. The injection means 42 are assembled to the flange 40 of the end-piece of the diffuser, then the chamber is in turn moved upstream and attached via its ring 52 to the injection means 42, the upstream rim 110 of this ring 52 being engaged radially inside the downstream rim 106 of the case in order to center it.

The case 90 may be removed by removing the ring 118 and repeating the aforementioned operations in the reverse direction.

The case 90 is attached by hot shrink-fitting in operation in the groove 108 and on the rim 110. For this, the rims 104, 106 of the case have, at ambient temperature, internal diameters that are less than the internal diameter of the groove 108 and the external diameter of the rim 110, respectively. The shrink-fitting of the case in the groove 108 and on the rim 110 is carried out by heat expansion in operation.

The walls of revolution 92 and 94 of the case preferably comprise through-holes (represented in dashed lines at 120 in FIG. 2) in order to balance the pressures inside and outside the case.

The invention claimed is:

1. A system for ventilating a combustion chamber wall in a turbomachine comprising:
   a centrifugal compressor including an impeller;
   a diffuser including an annular end-piece with a substantially L-shaped section that extends downstream and along the impeller of the centrifugal compressor so as to present a radial annular passageway for communicating a flow of air between a radially external end of the diffuser and an outlet of the compressor;
   an annular combustion chamber; and
   an annular case arranged radially between the combustion chamber and the end-piece of the diffuser and extending axially from the diffuser to the vicinity of the outlet of the combustion chamber and of the downstream end of the end-piece of the diffuser, the case including a radially external wall of revolution which cooperates with a radially internal wall of the combustion chamber to guide an air flow coming out of the diffuser, and a radially internal wall of revolution which cooperates with the end-piece of the diffuser so as to provide an annular channel therebetween for air coming out of the diffuser to pass through,
   wherein the end-piece of the diffuser includes an upstream radial portion which extends radially inward from an inlet of the diffuser and a cylindrical downstream portion which extends downstream from the upstream radial portion, and
   wherein the internal wall of revolution of the case includes an upstream annular portion which extends radially inward and substantially parallel to the upstream radial portion of the end-piece of the diffuser, an intermediate cylindrical portion which extends axially, and a frusto-conical downstream annular portion which extends downstream and radially outward.

2. The system as claimed in claim 1, wherein the case is formed of two half-shells assembled transversely together.

3. The system as claimed in claim 1, wherein the radially external wall of revolution of the case extends substantially parallel to the radially internal wall of the combustion chamber.

4. The system as claimed in claim 1, wherein the radially internal wall of revolution of the case extends substantially parallel to the end-piece of the diffuser.

5. The system as claimed in claim 1, wherein the walls of revolution of the case include pressure-balancing orifices.

6. The system as claimed in claim 1, wherein the case includes an upstream cylindrical rim centered and supported on the diffuser and a downstream cylindrical rim centered and supported on an annular ring of the internal wall of the combustion chamber.

7. The system as claimed in claim 6, wherein the upstream rim of the case is attached by shrink-fitting to the diffuser and the downstream rim of the case is attached by shrink-fitting to the annular ring of the internal wall of the combustion chamber.

8. The system as claimed in claim 6, wherein the upstream cylindrical rim of the case is crenellated and forms orifices which supply, with air coming out of the diffuser, the air passageway channel along the end-piece of the diffuser.

9. The system as claimed in claim 6, wherein the case is attached by a cylindrical ring engaged axially and attached to the downstream cylindrical rim of the case.

10. A turbomachine, which comprises a ventilation system as claimed in claim 1.

11. An annular case for a ventilation system according to claim 1, comprising two coaxial walls of revolution extending one inside the other, the upstream ends of these walls being connected to one another by an axial cylindrical rim oriented upstream, and the downstream ends of these walls being connected to one another by an axial cylindrical rim oriented downstream.

12. The case as claimed in claim 11, wherein the radially external wall is substantially frustoconical, and the radially internal wall has a substantially U-shaped section.

13. The case as claimed in claim 11, wherein the walls of revolution comprise orifices.

14. The case as claimed in claim 1, which is formed of two half-shells juxtaposed transversely.

15. The system as claimed in claim 1, further comprising an air injection unit which injects air to components disposed downstream of the combustion chamber, the air injection unit including an annular duct disposed between a downstream flange of the annular end-piece of the diffuser and an attachment flange of the combustion chamber.

* * * * *